US012719679B2

(12) United States Patent
Gagne-Keats et al.

(10) Patent No.: US 12,719,679 B2
(45) Date of Patent: Aug. 25, 2026

(54) DIGITAL NON-FUNGIBLE ASSETS IN PERSISTENT VIRTUAL ENVIRONMENTS LINKED TO REAL ASSETS

(71) Applicant: Aethon Operations, LLc, Dallas, TX (US)

(72) Inventors: Jason Sean Gagne-Keats, Cupertino, CA (US); Gary Anderson, San Mateo, CA (US); Wolfgang Wesley Muller, San Francisco, CA (US); Jean-Baptiste Charles Theou, Sene (FR)

(73) Assignee: Aethon Operations, LLC, Dallas, TX (US)

( * ) Notice: Subject to any disclaimer, the term of this patent is extended or adjusted under 35 U.S.C. 154(b) by 245 days.

(21) Appl. No.: 18/483,415

(22) Filed: Oct. 9, 2023

(65) Prior Publication Data

US 2024/0064019 A1 Feb. 22, 2024

Related U.S. Application Data

(63) Continuation-in-part of application No. 18/339,993, filed on Jun. 22, 2023, now Pat. No. 12,562,909,
(Continued)

(51) Int. Cl.
*H04L 29/06* (2006.01)
*H04L 9/08* (2006.01)
(Continued)

(52) U.S. Cl.
CPC .......... *H04L 9/3213* (2013.01); *H04L 9/0825* (2013.01); *H04L 9/3247* (2013.01); *H04W 12/71* (2021.01); *H04L 2209/60* (2013.01)

(58) Field of Classification Search
CPC ... H04L 9/3213; H04L 9/0825; H04L 9/3247; H04L 2209/60; H04L 63/0823;
(Continued)

(56) References Cited

U.S. PATENT DOCUMENTS 10,505,726 B1 * 12/2019 Andon .............. G06Q 10/0875
10,749,865 B2 8/2020 Andrade
(Continued)

FOREIGN PATENT DOCUMENTS

CN 113297604 A * 8/2021 ............. G06F 21/64
KR 20130082033 A * 7/2013 ............. G06Q 50/10
(Continued)

OTHER PUBLICATIONS

United States Patent & Trademark Office (USPTO), International Search Report and Written Opinion, PCT/US2023/061118, Jul. 17, 2023, counterpart to U.S. Appl. No. 18/158,454.

*Primary Examiner* — Sher A Khan
(74) *Attorney, Agent, or Firm* — ASHURST PERKINS COIE US LLP; Andrew T. Pettit; Katlyn Stockslager

(57) ABSTRACT

The technology relates to linking virtual assets and physical assets through non-fungible tokens (NFTs) in a metaverse. As such, the invention anchors a metaverse to the real world. The metaverse can limit ownership or rendering of certain virtual assets in the metaverse to only those who actually own physical assets. For example, the metaverse can limit a virtual representation of a car in the metaverse to those who own the real car. The linkage between the virtual and real assets can be verified in the metaverse based on NFTs stored on a blockchain. As such, only those who actually own a physical asset in the real world are associated with the virtual asset (or related representation) in the metaverse.

17 Claims, 4 Drawing Sheets

Related U.S. Application Data which is a continuation of application No. 18/158,891, filed on Jan. 24, 2023, now Pat. No. 11,750,388, application No. 18/483,415, filed on Oct. 9, 2023 is a continuation-in-part of application No. 18/158,454, filed on Jan. 23, 2023, now abandoned.

(60) Provisional application No. 63/267,080, filed on Jan. 24, 2022, provisional application No. 63/267,087, filed on Jan. 24, 2022.

(51) Int. Cl.
*H04L 9/32* (2006.01)
*H04W 12/71* (2021.01)

(58) Field of Classification Search
CPC ............... H04L 2209/56; H04L 9/0866; H04L 2209/80; H04L 9/50; H04W 12/71; H04W 12/068; H04W 12/069; H04W 12/35; H04W 12/48
See application file for complete search history.

(56) References Cited

U.S. PATENT DOCUMENTS

| | | | | |
|---|---|---|---|---|
| 10,893,408 | B2 * | 1/2021 | Park | H04W 12/06 |
| 11,334,883 | B1 * | 5/2022 | Auerbach | G06Q 20/223 |
| 12,003,642 | B2 * | 6/2024 | Mayne | H04L 9/0643 |
| 12,141,871 | B1 * | 11/2024 | James | G06Q 20/065 |
| 2001/0042204 | A1 * | 11/2001 | Blaker | G06F 16/9014<br>707/999.009 |
| 2015/0024852 | A1 | 1/2015 | Pacey et al. | |
| 2016/0203643 | A1 | 7/2016 | Kim et al. | |
| 2016/0300234 | A1 | 10/2016 | Moss-Pultz et al. | |
| 2019/0327210 | A1 * | 10/2019 | Mansour | H04L 63/045 |
| 2020/0184041 | A1 * | 6/2020 | Andon | G06F 21/16 |
| 2020/0242105 | A1 * | 7/2020 | Rich | H04L 9/40 |
| 2020/0273048 | A1 * | 8/2020 | Andon | G06Q 10/02 |
| 2021/0067342 | A1 | 3/2021 | Guinard et al. | |
| 2021/0082044 | A1 | 3/2021 | Sliwka et al. | |
| 2021/0201336 | A1 | 7/2021 | Mallett et al. | |
| 2021/0279695 | A1 | 9/2021 | Rice | |
| 2022/0279351 | A1 | 9/2022 | Blasi et al. | |
| 2022/0294630 | A1 | 9/2022 | Collen | |
| 2022/0351186 | A1 * | 11/2022 | Quigley | H04L 9/50 |
| 2022/0374902 | A1 * | 11/2022 | Sabintsev | G06Q 20/3676 |
| 2023/0009908 | A1 * | 1/2023 | Castinado | H04L 9/3242 |
| 2023/0034169 | A1 | 2/2023 | Ferenczi | |
| 2023/0043095 | A1 * | 2/2023 | Milam | H04L 9/3247 |
| 2023/0063245 | A1 * | 3/2023 | Young | H04L 9/3247 |
| 2023/0071377 | A1 | 3/2023 | Levin et al. | |
| 2023/0073859 | A1 | 3/2023 | Matthews et al. | |
| 2023/0104103 | A1 * | 4/2023 | Eby | H04L 9/50<br>705/69 |
| 2023/0128790 | A1 * | 4/2023 | Mayne | H04L 9/3234<br>713/172 |
| 2023/0135947 | A1 * | 5/2023 | Barhudarian | H04L 9/30<br>726/26 |
| 2023/0139878 | A1 * | 5/2023 | Clark | H04L 9/3297<br>713/157 |
| 2023/0144857 | A1 * | 5/2023 | Khan | H04L 9/30<br>713/168 |
| 2023/0166185 | A1 * | 6/2023 | Hiatt | A63F 13/44<br>463/1 |
| 2023/0179422 | A1 * | 6/2023 | Young | G06F 16/27<br>726/5 |
| 2023/0186291 | A1 * | 6/2023 | Haddad | G06Q 20/363<br>705/64 |
| 2023/0196426 | A1 * | 6/2023 | Bramlet | G06Q 20/389 |
| 2023/0214819 | A1 * | 7/2023 | Tham | G06Q 10/40<br>705/64 |
| 2023/0274244 | A1 * | 8/2023 | Quigley | G06F 21/602<br>705/65 |

FOREIGN PATENT DOCUMENTS

| | | | | |
|---|---|---|---|---|
| KR | 102397137 | B1 * | 5/2022 | G06Q 20/065 |
| KR | 20230018779 | A * | 2/2023 | G06Q 30/02 |
| KR | 20230036197 | A * | 3/2023 | G06F 21/44 |
| KR | 20230096214 | A | 6/2023 | |
| WO | 20200092900 | A3 | 5/2020 | |
| WO | WO-2021044211 | A1 * | 3/2021 | H04L 9/0643 |
| WO | 2022140454 | A1 | 6/2022 | |

* cited by examiner

DIGITAL NON-FUNGIBLE ASSETS IN PERSISTENT VIRTUAL ENVIRONMENTS LINKED TO REAL ASSETS

CROSS-REFERENCE TO RELATED APPLICATIONS

This application is a continuation-in-part of and claims priority to co-pending U.S. patent application Ser. No. 18/339,993 entitled "LINKING DIGITAL AND PHYSICAL NON-FUNGIBLE ITEMS" filed on Jun. 22, 2023, which claims benefit of U.S. Provisional Patent Application No. 63/267,080, filed Jan. 24, 2022. The aforementioned applications are incorporated herein by reference in their entirety for all purposes.

TECHNICAL FIELD

The disclosed teachings generally relate to digital non-fungible assets in persistent virtual environments linked to physical assets in the real world.

BACKGROUND

A non-fungible token (NFT) is a non-interchangeable unit of data stored on a blockchain, a form of digital ledger. Types of NFT data units include digital files such as photos, videos, and audio. Because each token is uniquely identifiable, NFTs differ from blockchain cryptocurrencies, such as Bitcoin. NFT ledgers can provide a public certificate of authenticity or proof of ownership.

BRIEF DESCRIPTION OF THE DRAWINGS

Detailed descriptions of implementations of the present invention will be described and explained through the use of the accompanying drawings.

Figure 1:
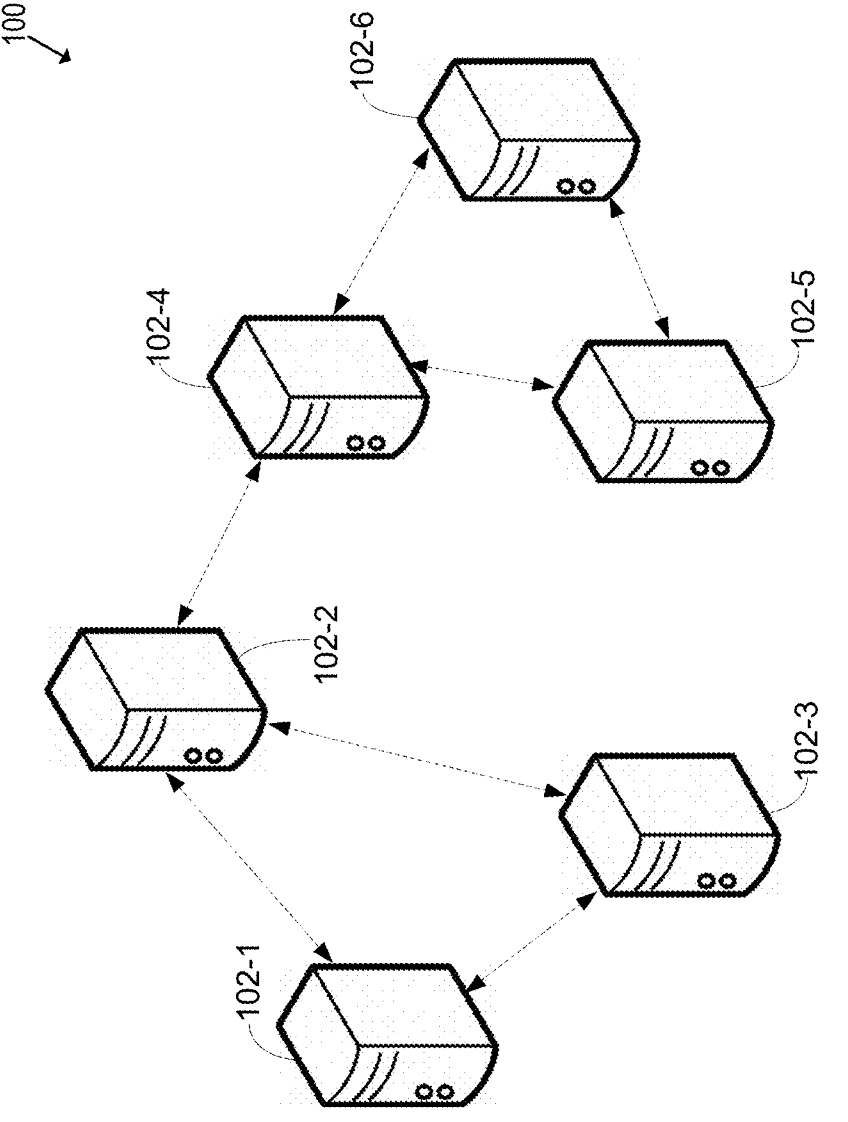
FIG. 1 is a block diagram that illustrates a blockchain including a network of peer nodes that can store non-fungible tokens (NFTs).

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to using non-fungible tokens (NFTs) in the metaverse where virtual assets are linked to physical assets through the NFTs. As such, the invention anchors the metaverse to real assets in the real world. The metaverse can limit ownership or rendering of certain virtual assets in the metaverse to those who actually own a physical asset. For example, the metaverse can limit a virtual representation of a car in the metaverse to those who own the real car. The linkage between the virtual and real assets can be verified in the metaverse based on NFTs stored on a blockchain. As such, only those who actually own a physical asset in the real world are associated with the virtual asset (or related representation) in the metaverse.

As used herein, a "metaverse" can refer to a network of virtual worlds focused on social connection. A metaverse incorporates many aspects of social media into a persistent three-dimensional world with the user represented as an avatar. Social functions are often an integral feature in many massively multi-user environments. The term often describes an iteration of the Internet as a single, universal virtual world that is facilitated by the use of virtual and augmented reality headsets. Several components of metaverse technologies can be implemented within modern internet-enabled platforms. Various metaverses have been developed for popular use such as virtual world platforms. The disclosed technology relates to a metaverse that integrates virtual and real spaces. Access points for metaverses include general-purpose computers and smartphones, in addition to augmented reality (AR), mixed reality, virtual reality (VR), and virtual world technologies. Current hardware development is focused on overcoming limitations of VR headsets, sensors, and increasing immersion with haptic technology.

The disclosed technology encompasses linking digital non-fungible assets as proof of ownership over any real assets such as a non-fungible physical object that is uniquely identifiable, particularly among other physical objects of the same kind or type and using a unique identifier. Examples include a vehicle identification number (VIN) of an automobile or a parcel number or physical address for real property. As such, the NFT or other unique digital asset can represent ownership over a scarce or unique non-fungible physical asset.

As used herein, an NFT is a unit of data that can be stored on a digital ledger (e.g., a blockchain), and the NFT can be sold and traded. The NFT can be associated with a particular digital and/or non-fungible physical asset (such as a file) and a license to use the asset for a specified purpose. An NFT (and, if applicable, the associated license to an underlying asset) can be traded and sold on secondary digital markets. Hence, NFT trading can result in an exchange of ownership over an underlying asset.

NFTs function like cryptographic tokens, but, unlike cryptocurrencies such as Bitcoin or Ethereum, NFTs are not mutually interchangeable, hence not fungible. While all bitcoins are equal, each NFT may represent a different underlying asset and thus may have a different value. NFTs are created when blockchains string records of cryptographic hash (a set of characters identifying a set of data) onto records therefore creating a chain of identifiable data blocks. This cryptographic transaction process ensures the authentication of each digital file by providing a digital signature that is used to track NFT ownership.

The NFT can represent a non-fungible physical asset decoupled from an owner. Whoever owns the NFT can register the NFT on a website for a metaverse, manufacturer, or distributor. Examples of a non-fungible physical asset include an electronic device, a vehicle, clothing, jewelry, or any other object that has a perceived value in the real world. For example, an entity (e.g., person) who purchases a McLaren automobile can be issued an NFT that links ownership of the McLaren to the owner. In another example, the person who purchases an Apple product can be issued an NFT that links ownership of the Apple product to the owner.

A blockchain can store the NFTs and associated transactions in records, copies of which are distributed and maintained among nodes of a computer network. The entries are stored in blocks of the distributed ledger that are cryptographically related. A public blockchain is a common example of a distributed ledger that can record data or transactions between parties in a verifiable and permanent way. Specifically, a blockchain system has a decentralized, distributed database where a ledger is maintained by peer nodes. Hence, an intermediary is not required to maintain a blockchain. The data are typically authenticated with cryptographic hashing and mining techniques.

The blockchain is analogous to a distributed database on a distributed computing system that maintains a continuously growing list of ordered records called blocks. A block of a blockchain includes records of transaction(s) or other recorded data (e.g., NFTs). Each block contains at least one timestamp, and a block links to a previous block to thus form a chain of blocks. Blockchains are inherently resistant to modification of their recorded data. That is, once recorded, the data in a block cannot be altered retroactively. Through a peer network and distributed timestamping, a blockchain is managed in an autonomous manner.

Decentralized consensus can be achieved with a blockchain. This makes blockchains suitable for recording NFTs, events, conditions, other records management activities, identity management, transaction processing, and proving data provenance. Examples of decentralized systems that implement blockchains include Bitcoin, Ethereum, and Solana. These types of systems provide a pragmatic solution for arriving at a consensus in the face of trust and timing problems typically encountered in distributed networks.

FIG. 1 illustrates a network 100 of interconnected peer nodes 102-1 through 102-6 (also referred to collectively as peer nodes 102 and individually as peer node 102). The peer nodes 102 can be distributed across various geographic locations including regions all over the world. The network 100 can include a combination of private, public, wired, or wireless portions. Data communicated over the network 100 can be encrypted or unencrypted at various locations or portions of the network 100. Each peer node 102 can include combinations of hardware and/or software to process data, perform functions, communicate over the network 100, and the like.

The peer nodes 102 can include computing devices such as servers, desktop or laptop computers, handheld mobile devices, and other electronic devices. Any component of the network 100 can include a processor, memory or storage, a network transceiver, a display, operating system, and application software (e.g., for providing a user interface), and the like. Other components, hardware, and/or software included in the network 100 that are known to persons skilled in the art are not shown or discussed herein for the sake of brevity.

The network 100 can implement a blockchain that allows for the secure management of a shared ledger, where NFTs are verified and stored on the network 100 without a governing central authority. Blockchains can be implemented in different configurations, ranging from public, open-source networks, to private blockchains that require explicit permission to read or write transactions. Central to a blockchain are cryptographic hash functions that secure the network 100, in addition to enabling transactions, to protect a blockchain's integrity and anonymity.

The network 100 can utilize cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. Moreover, the keys could be expressed in various formats, including hexadecimal format.

As such, the blockchain storing the NFT can be used as proof of ownership of a non-fungible physical asset and as a factor for authentication. In one implementation, cross-chain compatibility is enabled to transfer NFT-related data on different blockchains. For example, a personal digital wallet can hold the NFT, which does not need to be tied to a specific ecosystem (e.g., Solana blockchain). Instead, the disclosed technology is blockchain agnostic such that NFT-related data (e.g., a smart contract associated with an NFT transaction) can be transferred across different blockchains.

Figure 2:
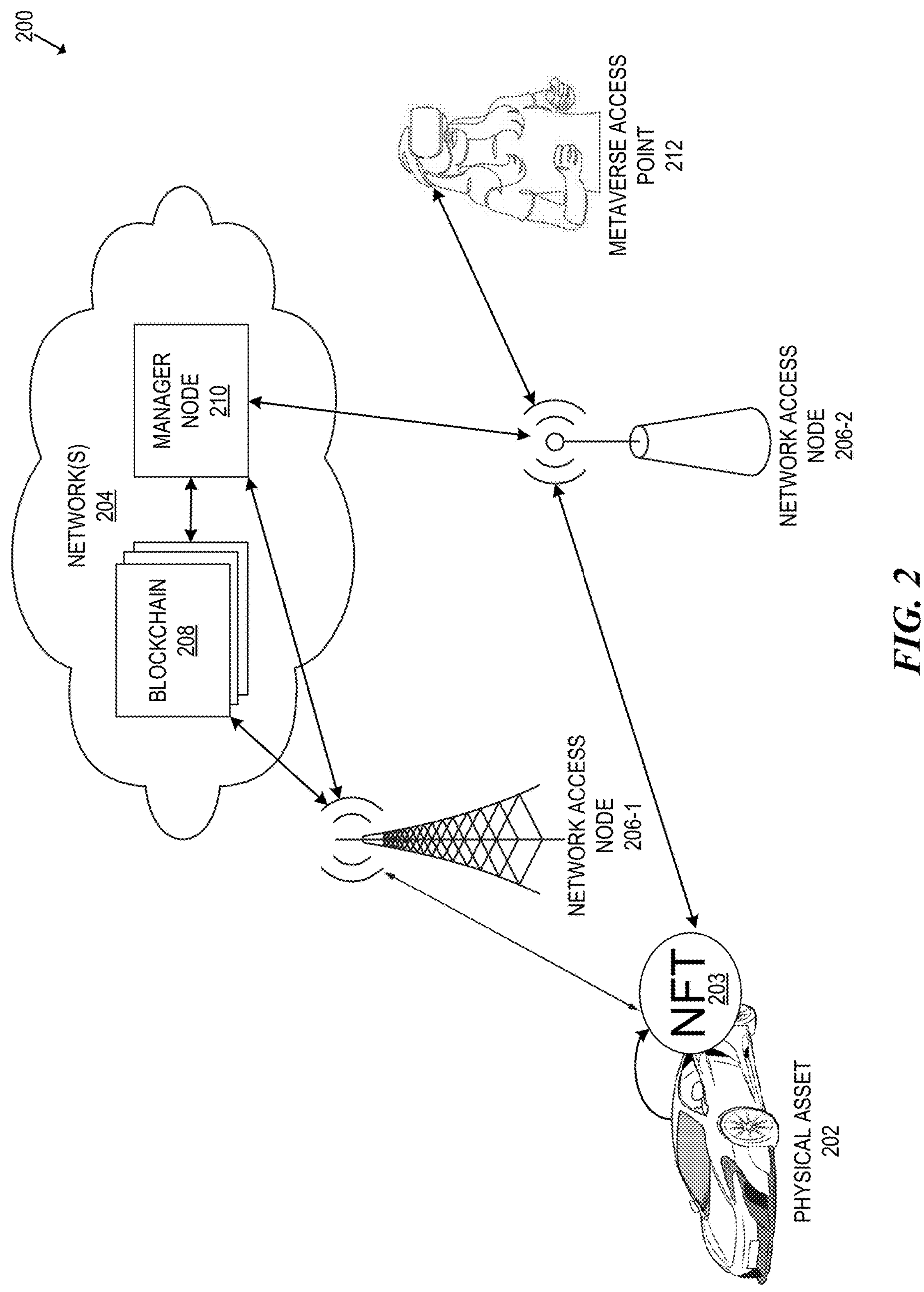
FIG. 2 is a block diagram that illustrates a system that can manage NFTs that anchor virtual assets in the metaverse to physical assets in the real world.

FIG. 2 is a block diagram that illustrates a system that can manage NFTs that anchor virtual assets in the metaverse to non-fungible physical assets in the real world. The system 200 includes a non-fungible physical asset 202 (e.g., a car) that is linked to an NFT 203, which can be communicated over one or more networks 204 via network access nodes 206-1 and 206-2 (referred to collectively as network access nodes 206) for storage at a blockchain 208. A manager node 210 can retrieve the NFT 203 to verify ownership of the non-fungible physical asset 202 to a participant of the metaverse via the metaverse access point 212. For example, a first user at the metaverse access point 212 that engages with an avatar of a second user in the metaverse can verify whether the second user owns the non-fungible physical asset 202 via the NFT 203. For example, the first user can click on a graphical representation of the non-fungible physical asset 202 in the metaverse to present whether the graphical representation of the non-fungible physical asset 202 is linked to the NFT 203. If so, the first user can verify that the second user indeed owns the non-fungible physical asset 202 in the real world. If not, the first user determines that the second user is faking ownership over the non-fungible physical asset. Said another way, users wishing to perform verification of ownership over non-fungible physical assets are able to do so in the metaverse by selecting a virtual object representing a non-fungible physical asset in the metaverse, where the virtual object displays an indication whether a link between the virtual object and the NFT representing the non-fungible physical asset exists. As such, the technology anchors the virtual world to the real world.

In some implementations, additional steps are taken to verify authenticity of NFTs and thereby strengthen security of NFT ownership and authentication. Specifically, the authentication process may utilize a digital signature that includes a private cryptographic key and a public cryptographic key associated with an owner of a non-fungible physical asset associated with the NFT to authenticate the NFT.

For example, the authenticity of an NFT can be verified by first causing the owner of the non-fungible physical asset associated with the NFT to digitally sign the NFT by computing a first unique hash of the NFT and encrypting the first unique hash of the NFT using a private cryptographic key to obtain a digital signature associated with the NFT. Encrypting the first unique hash of the NFT ensures that the NFT remains unmodified from the time the first unique hash is encrypted.

After the first unique hash of the NFT is encrypted, a second unique hash of the NFT is computed. Subsequently, the encrypted first unique hash is decrypted using a public cryptographic key to obtain a decrypted hash. If the decrypted hash and the second unique hash match, the match validates that the public cryptographic key used to decrypt the first unique hash belongs to the owner of the non-fungible physical asset. If the decrypted hash and the second unique hash do not match, the mismatch indicates that the public cryptographic key used to decrypt the first unique hash does not belong to the owner of the non-fungible physical asset, and further authentication procedures need to be taken in order to authenticate the NFT.

The non-fungible physical asset 202 can be any type of asset in the real world that can be represented with an NFT. In one example, the non-fungible physical asset is an electronic device, which can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustic, or other forms of propagated signals, such as carrier waves or infrared signals).

For example, a non-fungible physical asset can be a smartphone that can communicate wirelessly with a network node and/or with another electronic device in a cellular, computer, and/or mobile communications system. Other examples of a non-fungible physical asset include, tablet computers, wireless devices capable of machine-to-machine (M2M) communication, wearable electronic devices, Internet of Things devices (IoT devices), vehicles, jewelry, real property, and any other asset that can be represented as an NFT. Although only one non-fungible physical asset 202 is illustrated in FIG. 2, the disclosed embodiments can include any number of assets in the real world.

A non-fungible physical asset can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., non-fungible physical asset 202) and/or with another network node. The network access nodes 206 can be a network device or apparatus. Examples of network access nodes include a base station (e.g., network access node 206-1), an access point (e.g., network access node 206-2), or any other type of network node such as a network controller, radio network controller (RNC), base station controller (BSC), a relay, transmission points, and the like.

The system 200 depicts different types of wireless access nodes 206 to illustrate that the non-fungible physical asset 202, NFT 203, or metaverse access point 212 can access different types of networks through different types of network access nodes. For example, a base station (e.g., the network access node 206-1) can provide access to a cellular telecommunications system of the network(s) 204. An access point (e.g., the network access node 206-2) is a transceiver that provides access to a computer system of the network(s) 204.

The network(s) 204 can include any combination of private, public, wired, or wireless systems such as a cellular network, a computer network, the Internet, and the like. Any data communicated over the network(s) 204 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

The blockchain 208 that stores non-fungible data (e.g., NFTs 203) linked to the non-fungible physical asset 202 and communicated to the blockchain 208 via the network access nodes 206. The blockchain 208 is distributed over a combination of network nodes (e.g., peer nodes 102) that store NFTs and related data across other network nodes of a peer-to-peer network. The network nodes of the blockchain 208 can each replicate and store an identical copy of data and update independently. Although shown in the network(s) 204, the blockchain 208 can be located anywhere to maintain a tamper-proof copy of NFTs.

The manager node 210 can mediate the flow of NFTs and related data on the blockchain 208 with a metaverse via the metaverse access point 212. In some embodiments, the manager node 210 can include any number of server computers communicatively coupled to the network access nodes 206. The manager node 210 can include combinations of hardware and/or software to process condition data, perform functions, communicate over the network(s) 204, etc. For example, server computers of the manager node 210 can include a processor, memory or storage, a transceiver, a display, operating system and application software, and the like. Other components, hardware, and/or software included in the system 200 that are well known to persons skilled in the art are not shown or discussed herein for brevity. Moreover, although shown as being included in the network(s) 204, the manager node 210 can be located anywhere in the system 200 to implement the disclosed technology.

The system may generate an NFT that represents a non-fungible physical asset. In particular, system 200 may generate NFT 203 that represents non-fungible physical asset 202. In some embodiments, system 200 may receive an asset identifier corresponding to the non-fungible physical asset. System 200 may determine a device identifier associated with a user device. System 200 may generate, using an on-chain program, the NFT (e.g., NFT 203) assigned to the device identifier. The NFT (e.g., NFT 203) may include metadata including the asset identifier. The asset identifier may include a unique identifier corresponding to the non-fungible physical asset (e.g., non-fungible physical asset 202). The asset identifier may verify the ownership of the non-fungible physical asset (e.g., non-fungible physical asset 202).

In some embodiments, prior to generating the NFT, system 200 may request a user device for an account identifier. The account identifier corresponds to a metaverse account. System 200 may receive the account identifier. System 200 may store a device identifier. The device identifier may include an address associated with a cryptography-based storage application. A cryptography-based storage application may refer to a digital wallet.

The system may store the NFT and accompanying metadata on a blockchain thereby creating a link between the NFT and the non-fungible physical asset in a metaverse. In particular, system 200 may store NFT 203 and accompanying metadata on blockchain 208. In some embodiments, accompanying metadata may include a timestamp when a user acquired the non-fungible physical asset (e.g., non-fungible physical asset 202).

The system may display a virtual object is linked to the NFT that represents the non-fungible physical asset such that the virtual object in the metaverse is anchored to a non-fungible physical object via the NFT. In particular, system 200 may display a virtual object that is linked to NFT 203 and represents non-fungible physical asset 202 to a user at the metaverse access point 212. In some embodiments, the virtual object depicts an appearance of the non-fungible physical asset (e.g., non-fungible physical asset 202). In some embodiments, the virtual object depicts a physical or virtual asset other than the non-fungible physical asset (e.g., non-fungible physical asset 202).

The system may verify ownership of the non-fungible physical asset in the metaverse. In particular, system 200 may verify ownership of non-fungible physical asset 202 to a user at the metaverse access point 212 based on NFT 203 being linked to the virtual object. In some embodiments, system 200 may receive a request to verify the NFT (e.g., NFT 203) is linked to the virtual object. The request may include an NFT identifier corresponding to the NFT (e.g., NFT 203). In some embodiments, system 200 may receive the NFT identifier. System 200 may determine, based on the NFT identifier, an address of a cryptography-based storage application that stores the NFT (e.g., NFT 203). System 200 may receive an asset identifier corresponding to the non-fungible physical asset (e.g., non-fungible physical asset 202). System 200 may validate, based on the asset identifier, ownership of the non-fungible physical asset (e.g., non-fungible physical asset 202).

In some embodiments, the system may receive a request to update the virtual object. In particular, system 200 may receive, from a user device, a request to update the virtual object. The request may include an NFT identifier linked to the virtual object, an asset identifier, a timestamp of the update, and an updated image of the non-fungible physical asset (e.g., non-fungible physical asset 202).

In some embodiments, the system may verify the non-fungible physical asset has been updated. In particular, system 200 may verify the non-fungible physical asset (e.g., non-fungible physical asset 202) has been updated. System 200 may store, on the blockchain (e.g., blockchain 208), the NFT (e.g., NFT 203), and the accompanying metadata. The accompanying metadata may include a new timestamp. System 200 may remove the virtual object in the metaverse. System 200 may display a new virtual object in the metaverse.

In some embodiments, the user may sell the non-fungible physical asset. In particular, system 200 may receive, from a user device, a request to remove the virtual object. The request may include an NFT identifier linked to the virtual object, an asset identifier, and a timestamp of a sale. System 200 may verify the non-fungible physical asset (e.g., non-fungible physical asset 202) has been updated. System 200 may store, on the blockchain (e.g., blockchain 208), the NFT (e.g., NFT 203), and the accompanying metadata. The accompanying metadata may include a new timestamp. System 200 may remove the virtual object in the metaverse.

Figure 3:
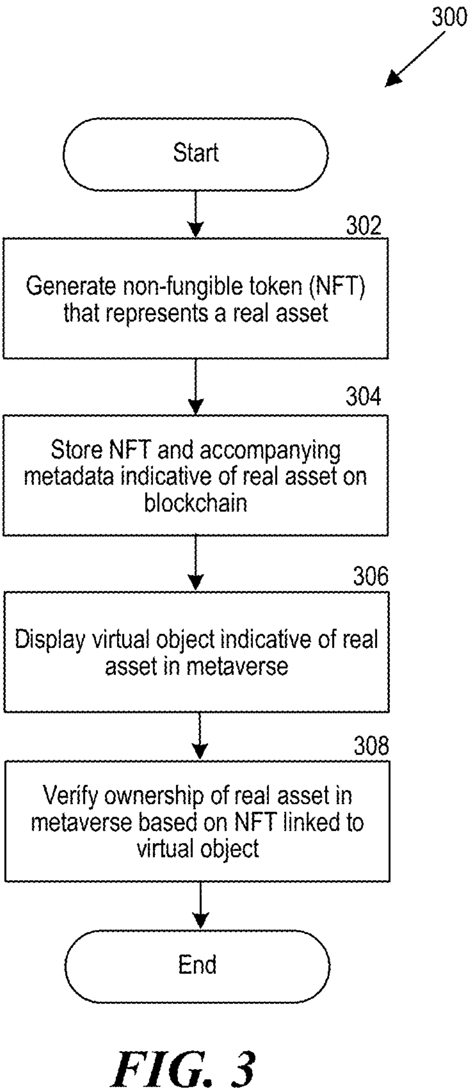
FIG. 3 is a flowchart that illustrates a method for managing digital non-fungible assets in persistent virtual environments linked to real assets.

FIG. 3 is a flowchart that illustrates a method for managing digital non-fungible assets in persistent virtual environments linked to non-fungible physical assets. At 302, the system 300 generates an NFT that represents a unique identifier of a real asset (e.g., non-fungible physical asset). At 304, the NFT is stored on a blockchain. The NFT can be stored on the blockchain as public evidence of ownership of the non-fungible physical asset. In one example, accompanying data (e.g., metadata) can be stored along with the NFT on the blockchain. The NFT-related data (NFT and metadata) enables verifying ownership of the non-fungible physical asset in a metaverse. At 306, the metaverse allows a display of a virtual object indicative of the non-fungible physical asset. The virtual object is linked to the NFT that represents the non-fungible physical asset such that the virtual object in the metaverse is anchored to the non-fungible physical object in the real world. At 306, a user can verify whether another user owns the non-fungible physical asset in the metaverse based on the NFT showing ownership.

The NFT is a tradable asset that provides a linkage between digital and physical objects and can act as an authentication factor in the metaverse. That is, the NFT can act as an authentication factor used for verifying who owns an asset in the real world. Thus, the technology can create scarcity in the metaverse if only owners of assets in the real world can display graphical representations of those assets or indications thereof in the metaverse. The digital representation in the metaverse does not necessarily have to depict the real-world appearance of the asset. Instead, for example, the representation in the metaverse can be a function or depiction of something else that signals the same scarcity. For example, the owner of a Lamborghini automobile can own an NFT generated based on a vehicle identification number (VIN) of the Lamborghini. A Lamborghini used by an avatar of a user in a metaverse can be a virtual object linked to the NFT, which indicates ownership over the Lamborghini by the user in the real world.

The technology also relates to a technique for transferring rights to a physical object based on ownership over a digital object that is intrinsically linked to the physical object. The NFT acts as a proof or evidence of the purchase (e.g., receipt). The NFT can be timestamped for the date of purchase or for a date that triggers certain utilities associated with the physical object. For example, an NFT for a particular phone can be associated with a future date such that the owner of the NFT at that date will be granted rights to the non-fungible physical asset via the NFT. As such, the NFT can be stored on a blockchain with accompanying metadata that is used to, for example, track services, historical data, or other status data for the non-fungible physical asset.

Computer System

Figure 4:
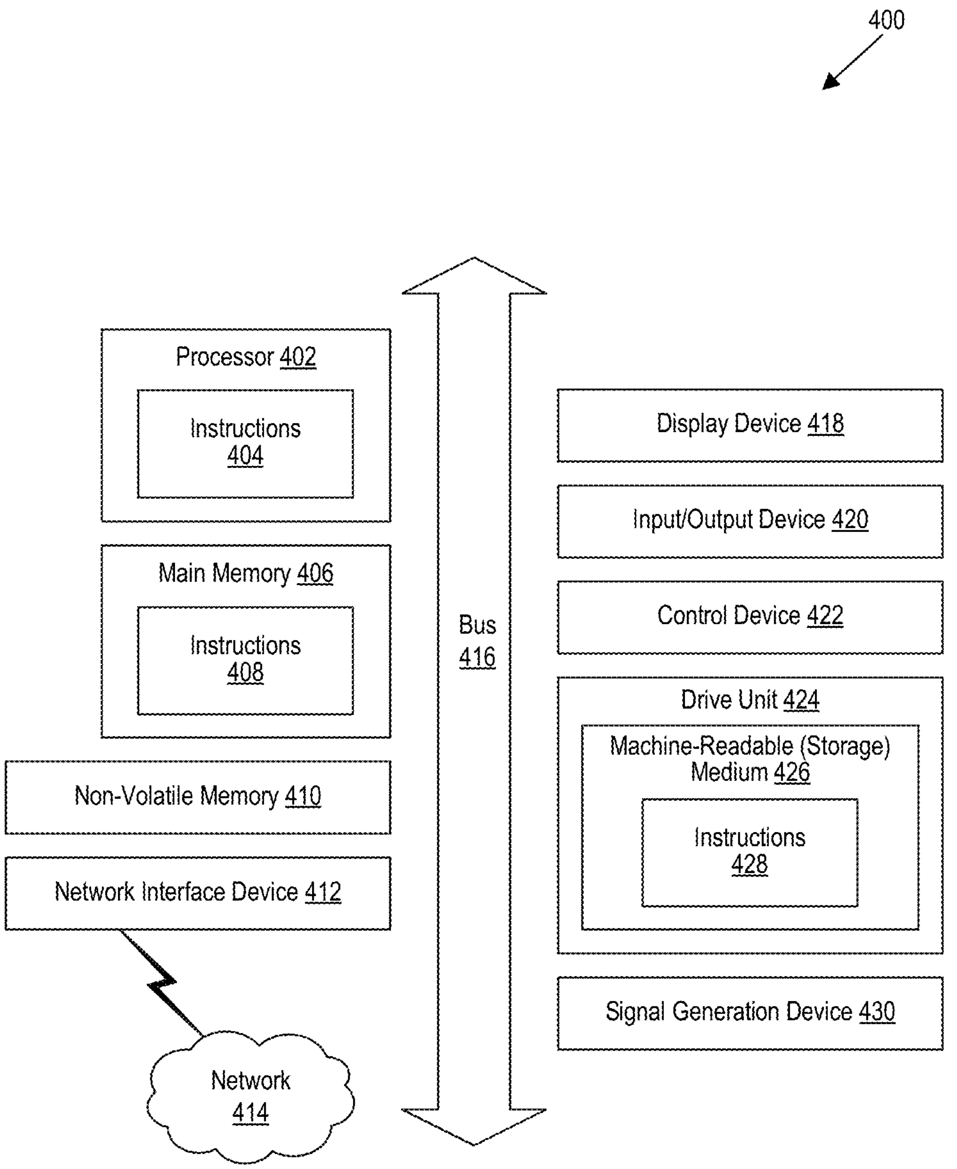
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words “means for.” However, the use of the term “for” in any other context is not intended to invoke a similar interpretation. The applicant reserves the right to pursue such additional claim forms in either this application or in a continuing application.

The invention claimed is:

1. A system for managing digital non-fungible assets in persistent virtual environments linked to physical assets, the system comprising:

one or more processors; and a non-transitory computer-readable storage medium storing instructions, which when executed by the one or more processors cause the one or more processors to perform operations comprising:

receiving, from a user device, a request to generate a non-fungible token (NFT) that represents a non-fungible physical asset;

generating, by the system in response to the request, the NFT that represents the non-fungible physical asset;

verifying authenticity of the NFT by sending a command to the user device to encrypt and decrypt a digital signature associated with the NFT using a key pair including a private cryptographic key and a public cryptographic key;

storing, by the system, the NFT and accompanying metadata on a blockchain thereby creating a link between the NFT and the non-fungible physical asset;

generating, by the system, a display of a virtual object indicative of the non-fungible physical asset in a metaverse, wherein the virtual object is linked to the NFT that represents the non-fungible physical asset;

requesting the user device for an account identifier that corresponds to a metaverse account;

receiving the account identifier;

storing a device identifier that comprises an address associated with a cryptography-based storage application;

generating, by the system through the virtual object in the metaverse, a display of an indication whether the link between the virtual object and the NFT exists; and allowing, by the system, participants of the metaverse to verify possession of the non-fungible physical asset in the metaverse based on the indication that the link between the virtual object and the NFT exists.

2. A method for managing digital non-fungible assets in persistent virtual environments linked to physical assets, the method comprising:

generating a non-fungible token (NFT) that represents a non-fungible physical asset;

verifying authenticity of the NFT by sending a command to a user device associated with the NFT to encrypt and decrypt a digital signature associated with the NFT using a cryptographic key pair;

storing the NFT and accompanying metadata on a blockchain thereby creating a link between the NFT and the non-fungible physical asset;

receiving an asset identifier corresponding to the non-fungible physical asset;

determining a device identifier associated with the user device;

generating, using an on-chain program, the NFT assigned to the device identifier, wherein the NFT comprises metadata including the asset identifier;

causing a display of a virtual object indicative of the non-fungible physical asset in a metaverse, wherein the virtual object is linked to the NFT that represents the non-fungible physical asset, generating a display of an indication whether the link between the virtual object and the NFT exists; and verifying ownership of the non-fungible physical asset based on the display of the indication whether the link between the virtual object and the NFT exists.

3. The method of claim 2, wherein the virtual object depicts an appearance of the non-fungible physical asset.

4. The method of claim 2, wherein the virtual object depicts a physical or virtual asset other than the non-fungible physical asset.

5. The method of claim 2, further comprising:

requesting the user device for an account identifier, wherein the account identifier corresponds to a metaverse account;

receiving the account identifier corresponding to the metaverse account; and storing a device identifier, wherein the device identifier comprises an address associated with a cryptography-based storage application.

6. The method of claim 2, wherein verifying ownership of the non-fungible physical asset in the metaverse further comprising:

receiving from an avatar in a virtual environment, further comprises receiving, a second request to verify the NFT linked to the virtual object, and wherein the second request comprises an NFT identifier corresponding to the NFT.

7. The method of claim 6, further comprising:

receiving the NFT identifier;

determining, based on the NFT identifier, an address of a cryptography-based storage application that stores the NFT; and validating, based on the asset identifier, ownership of the non-fungible physical asset.

8. The method of claim 2, wherein accompanying metadata comprises a timestamp indicating when a user acquired the non-fungible physical asset.

9. The method of claim 2, further comprising:

receiving, from the user device, a request to update the virtual object, wherein the request comprises an NFT identifier linked to the virtual object, the asset identifier, a timestamp of update, and an updated image of the non-fungible physical asset.

10. The method of claim 9, further comprising:

verifying the non-fungible physical asset has been updated;

storing, on the blockchain, the NFT and the accompanying metadata, wherein the accompanying metadata comprises a new timestamp;

removing the virtual object in the metaverse; and displaying a new virtual object in the metaverse.

11. The method of claim 2, wherein a user sells the non-fungible physical asset, further comprises:

receiving, from the user device, a request to remove the virtual object, wherein the request comprises an NFT identifier linked to the virtual object, the asset identifier, and a timestamp of sale;

verifying the non-fungible physical asset has been updated;

storing, on the blockchain, the NFT and the accompanying metadata, wherein the accompanying metadata comprises a new timestamp; and removing the virtual object in the metaverse.

12. A non-transitory, computer-readable storage medium storing instructions that when executed by one or more processors cause the one or more processors to perform operations comprising:

generating a non-fungible token (NFT) that represents a non-fungible physical asset;

storing the NFT and accompanying metadata on a blockchain thereby creating a link between the NFT and the non-fungible physical asset;

displaying a virtual object indicative of the non-fungible physical asset in a metaverse, wherein the virtual object is linked to the NFT that represents the non-fungible physical asset;

displaying an indication whether the link between the virtual object and the NFT exists;

verifying ownership of the non-fungible physical asset based on the indication that the link between the virtual object and the NFT exists; and receiving, from a user device, a request to update the virtual object, wherein the request comprises an NFT identifier linked to the virtual object, an asset identifier, a timestamp of update, and an updated image of the non-fungible physical asset.

13. The non-transitory, computer-readable storage medium of claim 12, wherein the instructions further cause the one or more processors to perform operations comprising:

requesting the user device for an account identifier, wherein the account identifier corresponds to a metaverse account;

receiving the account identifier corresponding to the metaverse account; and storing a device identifier, wherein the device identifier comprises an address associated with a cryptography-based storage application.

14. The non-transitory, computer-readable storage medium of claim 12, wherein the instructions further cause the one or more processors to perform operations comprising:

verifying the non-fungible physical asset has been updated;

storing, on the blockchain, the NFT and accompanying metadata, wherein the accompanying metadata comprises a new timestamp;

removing the virtual object in the metaverse; and displaying a new virtual object in the metaverse.

15. The non-transitory, computer-readable storage medium of claim 12, wherein the instructions for a user selling the non-fungible physical asset, cause the one or more processors to perform operations comprising:

receiving, from the user device, a second request to remove the virtual object, wherein the second request comprises the NFT identifier linked to the virtual object, the asset identifier, and a timestamp of sale;

verifying the non-fungible physical asset has been updated;

storing, on the blockchain, the NFT and accompanying metadata, wherein the accompanying metadata comprises a new timestamp; and removing the virtual object in the metaverse.

16. The non-transitory, computer-readable storage medium of claim 12, wherein the instructions verifying ownership of the non-fungible physical asset in the metaverse receiving from an avatar in a virtual environment, further cause the one or more processors to perform operations comprising:

receiving, a second request to verify the NFT linked to the virtual object, wherein the second request comprises the NFT identifier corresponding to the NFT.

17. The non-transitory, computer-readable storage medium of claim 16, wherein the instructions further cause the one or more processors to perform operations comprising:

receiving the NFT identifier;

determining, based on the NFT identifier, an address of a cryptography-based storage application that stores the NFT;

receiving the asset identifier corresponding to the non-fungible physical asset; and validating, based on the asset identifier, ownership of the non-fungible physical asset.

* * * * *